Figure 1:
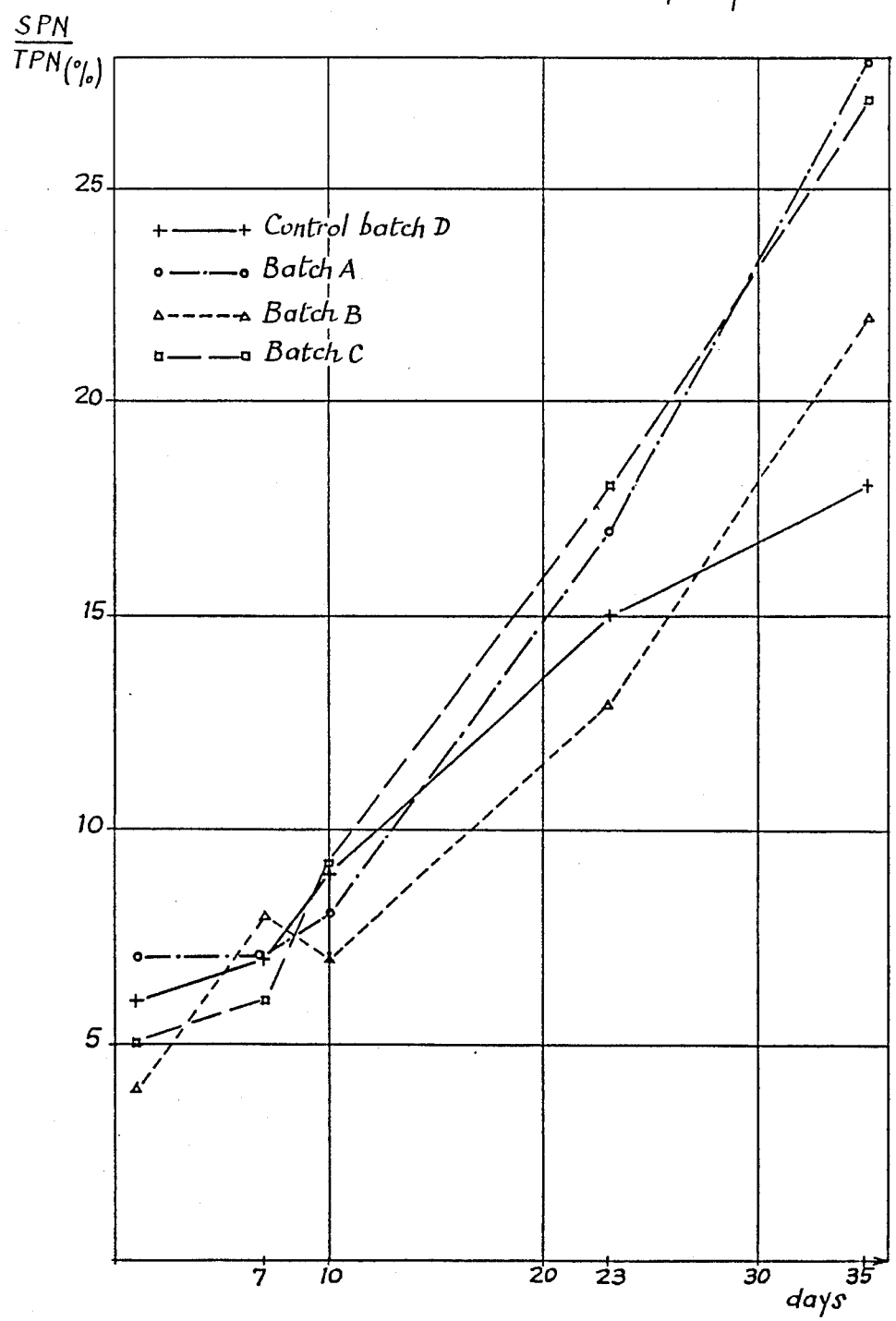

United States Patent [19]

Lagarde

[11] Patent Number: 4,798,726
[45] Date of Patent: Jan. 17, 1989

[54] PROCESS FOR THE TREATMENT OF MILK FOR CHEESEMAKING

[75] Inventor: Gilles Lagarde, Paris, France
[73] Assignee: Sanofi, Paris, France
[21] Appl. No.: 47,259
[22] Filed: May 8, 1987

[30] Foreign Application Priority Data

May 15, 1986 [FR] France ................... 86 07002

[51] Int. Cl.$^4$ ............... A23C 19/032; A23C 19/05
[52] U.S. Cl. .................................. 426/40; 426/36; 426/61; 426/582
[58] Field of Search ............ 426/36, 40, 42, 43, 426/61, 582

[56] References Cited

FOREIGN PATENT DOCUMENTS 159743  1/1985  European Pat. Off. .

OTHER PUBLICATIONS

Chem. Abstracts, vol. 85, No. 8, Oct. 1976, p. 374, No. 107580w, The Contribution of Starter Streptococci to Flavor Development in Cheddar Cheese, & J. Dairy Res. 1976, 43(2), 301–11.

Milchwissenschaft, vol. 39, No. 3, 1984, pp. 136–139; R.S.-T. Yu et al., "Conditions for the Production and Regeneration of Protoplasts from Lactic Streptococci".

Chem. Abstracts, vol. 78, No. 1 Jan. 8, 1973, p. 252, No. 2903f, Columbus, OH, US; I, Akashi, Akira: "Effect of Egg White Lysozyme on the Growth of Cheese Starter Organisms" & J. Fac. Agr. Kyushu Univ. 1972 17(1), 67–73.

*Primary Examiner*—Marianne Cintins
*Attorney, Agent, or Firm*—Bacon & Thomas

[57] ABSTRACT

The present invention relates to a process for the treatment of milk for cheesemaking. The said treatment process consists in inoculating the milk with bacterial protoplasts before rennet is added.

7 Claims, 2 Drawing Sheets

PROCESS FOR THE TREATMENT OF MILK FOR CHEESEMAKING

The present invention relates to a process for the treatment of milk for cheesemaking.

The invention is applied in the food industries and especially the cheese industry.

The traditional method of cheesemaking is known to be based on curdling the milk under the action of an enzyme—rennet—and the lactic acid originating from conversion of the lactose by the lactic bacteria, followed by draining the resulting curds by syneresis (Techniques laitières (Dairy techniques), R. VEISSEYRE—La Maison Rustique—1965—PARIS—FRANCE).

The cheese prepared in this way is then subjected to a very short enzymatic maturing phase in which mainly the enzymes of the lactic bacteria, contained in the milk or introduced into it before conversion, exert their action and lead to the production of flavor precursors and flavors; the cheese matured in this way is called "cream cheese". The cheese can then be subjected to a prolonged enzymatic maturing phase, known by the term "ripening", after which a ripe cheese is obtained.

The traditional method for making ripe cheese is subject to numerous variations. The curdling can be caused predominantly by rennet or predominantly by lactic acid or alternatively by a combination of both. The draining can be spontaneous or accelerated by a variety of means (cutting, mashing, boiling, pressing, pounding). The ripening itself varies with the nature of the microorganisms whose development is encouraged. These variations determine which of the various known types of cheese is obtained; these types can be grouped into soft cheeses, e.g. camembert, pressed cheeses, e.g. cantal and cheddar, boiled cheeses, e.g. gruyère de comté, and blue-veined cheeses with internal mold development, e.g. roquefort.

It is also known that cheese can be made by subjecting the previously skimmed milk to an ultrafiltration treatment beforehand (J. L. MAUBOIS et al., Le Lait/SEPTEMBER–OCTOBER 1971/no. 508), which in fact enables the draining operation to be carried out even before the milk is curdled. This ultrafiltration produces two liquids: the ultrafiltrate or permeate, which passes through the ultrafiltration membrane, and the filtration residue, which is a milk enriched in proteins (caseins and soluble proteins).

Mixed with cream, this filtration residue forms a liquid cheese precursor which, after inoculation with bacteria, addition of rennet and molding, produces curds which can be ripened. This technique is very suitable for making soft cheeses and hard cheeses of the saint-paulin type (P. DUCRUET et al., La Technique Laitière no. 957—September 1981).

The ripening of the curds is a very complex process in which the cheese undergoes enzymatic maturing for the purpose of developing its taste while at the same time modifying its appearance, texture and consistency. This process is the result of the action exerted by enzymes on the proteins and lipids, which are the main constituents of the curds.

Proteolysis and, in some cases, lipolysis actually seem to be the two fundamental biochemical phenomena governing the extent to which the texture is modified and the flavor of the cheese is developed during ripening.

It is known that the enzymes which take part in the ripening of the curds are essentially provided by the microorganisms coming into effect as the said curds develop during ripening. It is clear that the microorganisms which are initially present in the milk and have not been removed by a heat treatment of the milk, or have been provided by an exogenous inoculation in the form of a bacterial leaven [lactic bacteria (genus Lactobacillus, Leuconostoc and Streptococcus), alkalizing corynebacteria (genus Arthrobacter and Bacterium (*B. linens*)), propionic bacteria (genus Propionibacterium), micrococci (genus Micrococcus)] or in the form of a fungal leaven, at the start of the production process, are of primary importance in this connection.

The ripening is a generally slow process, since it can last three weeks for a spontaneous-draining and quick-curdling cheese such as a camembert, four months for a so-called accelerated-draining cheese without boiling, such as cantal, and two years for an accelerated-draining cheese with boiling, such as parmesan. It has therefore proved advantageous to reduce the ripening time.

Several solutions have been put forward to date.

Thus it is known that the ripening of a cheese can be accelerated by the exogenous provision of enzymes. Lipases of animal origin (traditional rennets in paste form, made from the contents of kids' or lambs' stomachs, or preparations containing pregastric esterases or esterases of fungal origin (extracted from e.g. Mucor Miehei)) are used especially for the production of Italian pressed hard cheeses with a piquant flavor, such as provolone, asiago or romano. The use of proteases and microbial peptidases (derived e.g. from the bacterial genus Bacillus and fungal genus Aspergillus), either purified or in the form of a cell extract, has also been recommended.

Likewise, it is known [Z. DILANIAN et al., Milchwissenschaft, 31: 217 (1976)] that the use of mutant lactic bacteria selected for their high enzymatic (in particular proteolytic) activities enables ripening to be accelerated considerably.

It is also known [H. E. PETERSON et al., J. Dairy Res. 42: 313 (1975)] that an increase in the number of lactic bacteria in the curds can help to accelerate ripening. The part played by lactic streptococci in the formation of amino acids and small peptides has been clearly demonstrated as far as the ripening of boiled pressed cheese is concerned. It has now also been established that amino acids and small peptides act as flavor precursors in cheese and that the appearance of these precursors, and consequently the formation of the flavor, can be accelerated by increasing the number of lactic bacteria in the curds by means of an exogenous inoculation at the start of the manufacturing process.

However, each of the techniques studied for accelerating ripening is accompanied by disadvantages, often of major importance. Thus, the use of enzymes gives uncertain results. The use of proteases or peptidases can actually have the consequence of producing bitter flavors. The choice of enzymes (lipases and proteases) has to be subject to selection on account of their specificity, which is sometimes difficult to determine. They are not easy to incorporate during the manufacturing process: adding them to the milk in the vat, before rennet is added, results in substantial losses in the whey, and adding them to the curds not only modifies the rheological properties of the latter but also detracts from their homogeneous distribution. Similarly, the development of ripening with the aid of mutant lactic bacteria is limited because of the appearance of bitter flavors. Finally, acceleration of ripening by increasing the number of lactic bacteria in the curds is difficult to implement because an increase of this kind can substantially modify the usual manufacturing technology and lead to the production of atypical cheese.

The Applicant has in fact designed and carried out a process for the treatment of milk which, in the case of the manufacture of a cream cheese, makes it possible to enhance the production of flavor precursors and flavors within the cheese and, in the case of the manufacture of a ripe cheese, makes it possible to accelerate the ripening, while at the same time mitigating the defects inherent in the techniques of the prior art.

The process according to the invention is based on the use of bacterial protoplasts to inoculate the milk prepared for cheesemaking, before the rennet is added.

Inoculating the milk with protoplasts makes it possible to obtain cream cheese or ripe cheese. According to their richness in flavor precursors and flavors, their degree of ripening and especially their appearance, these cheeses can be consumed as such or can be added to a food product in the course of preparation, for which they constitute a substrate rich in flavors or flavor precursors.

This process applies to the treatment of milk whatever its origin. It is in fact intended to give the word "milk" a broad meaning here. In the context of traditional cheesemaking, it can be a raw milk which will be used as such, or a milk which has first undergone a pasteurizing heat treatment. This milk will preferably have been skimmed beforehand if the manufacturing process is to entail a partial or total skimming phase. In the context of cheesemaking which involves ultrafiltration, the milk can also be the filtration residue.

The protoplasts used are prepared from the bacteria taking part in the ripening of the cheese. In particular, the said bacteria can be those normally grouped together under the name of "lactic bacteria", among which the genera Lactobacillus, Leuconostoc and Streptococcus can be classified; they can also be alkalizing corynebacteria, among which the genus Arthrobacter and the species *Bacterium linens* play a decisive part; alternatively, they can be micrococci or propionic bacteria whose action is well known for cheeses with internal holes, such as gruyère de comté, and which are represented essentially by the genus propionibacterium.

The choice of protoplasts is determined by the intended cheese production. It should be noted that protoplasts derived from lactic enzymes may be used to advantage for all types of cheesemaking since lactic bacteria participate in all the ripening processes. They are very particularly suitable for the production of soft cheese and especially camembert.

The protoplasts are prepared by the known techniques of the prior art. This preparation consists in removing the bacterial wall. This result can be achieved through the use of lysozyme in particular. A possible procedure is indicated below by way of example.

A preparation very rich in bacteria, it being possible for the number of bacteria reached to correspond to $10^{11}$ or even $10^{12}$ revitalizable germs per gram, is manufactured from the bacterial strain or strains concerned. This preparation can take various forms. For example, it can be deep-frozen or freeze-dried. The high proportion of bacteria can be obtained by means of treatments such as ultrafiltration or ultracentrifugation.

This preparation is then used to inoculate bacteriologically clean water which is kept at 37° C. by means of appropriate heating (absolute sterilization is not necessary) and which advantageously has a low concentration of mineral elements (for example an $Na^+$ ion concentration of less than 0.3M). The water is inoculated so as to give a suspension containing from $10^9$ to $10^{14}$ protoplasts per liter (according to the intensity of the desired effect) when it is envisaged to add this suspension to the milk at a rate of one part of suspension to one hundred parts of milk. After the bacteria have been added, the water is stirred to promote their homogeneous distribution.

Lysozyme is then introduced, advantageously in the form of the hydrochloride, in the amount which gives a concentration equivalent to 0.5 mg/ml of the standard lysozyme preparation of the Fédération Internationale Pharmaceutique (CENTER FOR STANDARDS—WOLTERSLAAN 16—9000 GENT—BELGIUM), whose activity corresponds to 37,600 FIP units/mg and which is designated hereafter as "FIP lysozyme".

After homogenization of the bacterial suspension by stirring, the pH is adjusted to a value preferably of between 7 and 8. Finally, incubation is carried out for about 20 minutes at 37° C., enabling the lysozyme to exert its enzymatic action on the bacterial wall and producing a suspension of protoplasts. It should be noted that the application of this process to lactic bacteria results in the production of protoplasts which have lost the acidifying power characteristic of the bacteria from which they are derived.

The suspension of protoplasts can be stabilized for use at a later stage, especially by:

the incorporation, into the suspension of protoplasts, of an osmotic stabilizer, such as sucrose or lactose, at a concentration of 0.5M, or the reconstitution, using the said suspension of protoplasts and skimmed milk powder, of a milk whose osmotic pressure is very similar to that of the intracellular contents of the protoplasts.

Without this stabilization, the suspension of protoplasts must be used within a period of no more than 30 minutes, taken from the time when the lysozyme is added to the bacterial suspension.

The suspension of protoplasts is therefore added to the milk in the production vat, before addition of the rennet, in an amount such that the milk contains from $10^8$ to $10^{13}$ protoplasts per liter and preferably $10^{10}$ to $10^{11}$ protoplasts per liter.

Advantageously, the milk inoculated in this way is stirred so as to distribute the protoplasts homogeneously in the vat. The manufacturing process then continues in the normal way.

A major advantage afforded by the use of such protoplasts is their gradual lysis, which is spread out over a period of time. Lysis actually takes place when the concentration of sodium chloride in the aqueous phase of the curds becomes greater than about 0.3M (i.e. greater than about 17.5 g/l) after the cheese has been salted; this concentration is not reached simultaneously in all the zones of the cheese and there is a sodium chloride concentration gradient from the surface towards the middle of the cheese. The lysis of the protoplasts therefore takes place gradually, from the periphery to the middle of the cheese, the rate of this process being inversely proportional to the size of the cheese. Thus, for example, the concentration of 17.5 g/l of salt in the aqueous phase of the cheese can be reached in 48 hours in the middle of a camembert.

The use of protoplasts in the type of cheesemaking process envisaged is all the more advantageous because, in contrast to the bacteria themselves, the said protoplasts are insensitive to the bacteriophages which are usually attached to receptors located on the surface of the bacterial wall. As the protoplasts derived from lactic bacteria lose the acidifying power characteristic of the said bacteria, they can be used without running the risk of excessive acidification.

The invention will now be illustrated by examples. Of course, it is not limited to the methods of application considered more particularly here; on the contrary, it encompasses all the variants thereof within the scope of the claims.

EXAMPLE

Manufacture of camembert, by a traditional method, from milk inoculated beforehand with a suspension of protoplasts

I—Experimental Protocol 1.1. Preparation of the milk:

Milk, adjusted to a fat content of 26 g per liter, is preinoculated at a rate of 0.2% (by volume) of mesophilic enzymes (*S. cremoris, S. lactis, S. diacetylactis* and *Leuconostoc cremoris*). After maturing at 10° C. for 18 h, the main inoculation is carried out at a rate of 1% (by volume) with the same enzymes.

The milk prepared in this way is divided up into vats each containing 84 liters, which are then left at 34° C. for 3 h.

The vats are subsequently divided up into four batches: A, B, C and D.

1.2. Preparation of three suspensions of protoplasts:

(a) The bacterial cultures used:

Each suspension of protoplasts is prepared from one of the following three freeze-dried cultures of lactic enzymes:
culture of a strain of *Streptococcus cremoris*,
culture of a strain of *Streptococcus lactis* and
culture of a mixture of a strain of *Streptococcus cremoris* and a strain of *Streptococcus lactis*.

These cultures take the form of a lyophilizate and contain $5 \cdot 10^{11}$ revitalizable bacteria per gram.

Cultures of this type can be obtained in particular from the EUROZYME Company (PARIS - FRANCE).

(b) Protocol for the preparation of one liter of suspension:

1 l of water (non-distilled) is autoclaved for 30 min at 90° C. and cooled to 37° C.

1 g of freeze-dried culture is dispersed in water. The resulting suspension contains 0.5 g (dry weight) of cells per liter.

0.5 g of a lysozyme hydrochloride preparation containing at least 98% of FIP lysozyme is added.

The pH is adjusted to about 8.

The suspension prepared in this way is left at 37° C. for 15 min.

The efficacy of the conversion to protoplasts was checked by using 0.1 ml of the cell suspension for the bulk inoculation, at time $t=0$ (addition of the lysozyme) and time $t=15$ min (end of the incubation), of a culture medium having the characteristics of the medium M17. This medium is selective for streptococci and non-protective towards protoplasts, i.e. it does not allow them to develop. It has been described by TERZACHI and SANDINE (Appl. Microbiol. 29, 807-813 (1975)). Counting the visible colonies after incubation for 48 h at 37° C. indicates that, at time $t=15$ min, the number of whole bacteria has decreased in a mean ratio of $1/10^6$ relative to time $t=0$.

1.3. Inoculation of the milk with the suspensions of protoplasts:

Each vat of batches A, B and C receives 1 l of one of the suspensions of protoplasts prepared according to 1.2. (the suspension of *Streptococcus cremoris* protoplasts for batch A, the suspension of *Streptococcus lactis* protoplasts for batch B and the suspension of mixed *Streptococcus cremoris*/*Streptococcus lactis* protoplasts for batch C).

The vats of batch D do not receive protoplasts, being intended to serve as the control.

1.4. Treatment of the inoculated milk:

Rennet is then added to the milk inoculated according to 1.3. This is done by pouring 14 ml of a rennet (GRANDAY Laboratories—FRANCE), containing 570 mg of chymosin per liter, into each vat.

Under the action of the rennet, the milk curdles and solidifies; the resulting curds are cut into slices and then placed in molds. Draining is allowed to take place spontaneously, the molds being turned over twice. After 24 hours, the cheeses are removed from the molds and sprayed on the surface with a suspension of *Penicillium candidum* spores in distilled water. Four hours later, the cheeses are rapidly dipped in brine. They are then transported to ripening rooms at 13° C., in which the air has a relative humidity of 90%. Ripening takes place under these conditions for 13 days. On day 14, the cheeses are wrapped and left at 7° C.

II—Results

Different measurements were made on samples of cheese taken at different times during the manufacturing process, D1 being the day on which the process is started:
Day D1, after salting in brine,
Day D7,
Day D13, when the cheese is wrapped,
Day D21 and
Day D35.

2.1. Influence of the addition of protoplasts on cheese preparation during the phases of curdling and draining of the curds:

No difference was observed between the parameters measured on the milk and curds derived from vat batches A, B and C and the parameters measured on the milk and curds derived from control batch D.

The curdling times, in particular, are identical.

The acidification curves are similar; the pH values on removal from the molds are very similar:
pH on removal from the molds are very similar:

|         | pH on removal from the mold |
|---------|-----------------------------|
| Batch A | 4.77                        |
| Batch B | 4.78                        |
| Batch C | 4.80                        |
| Batch D | 4.75                        |

The pH values thus obtained reflect the loss of acidifying power by the bacteria converted to protoplasts.

2.2. Influence of the addition of protoplasts on the ripening:

Two proteolysis indices were measured. Organoleptic tests were also carried out.

(a) Assessment of the proteolysis with the aid of indices: The proportions of total protein nitrogen (TPN), soluble protein nitrogen (SPN) and non-protein nitrogen (NPN) were measured [J. LENOIR, Le Lait, 43, 154–165 (1963)] and their ratios SPN/TPN and NPN/TPN, which represent indices of the degree of proteolysis (the higher the ratios, the greater the proteolysis), were calculated.

Figure 2:
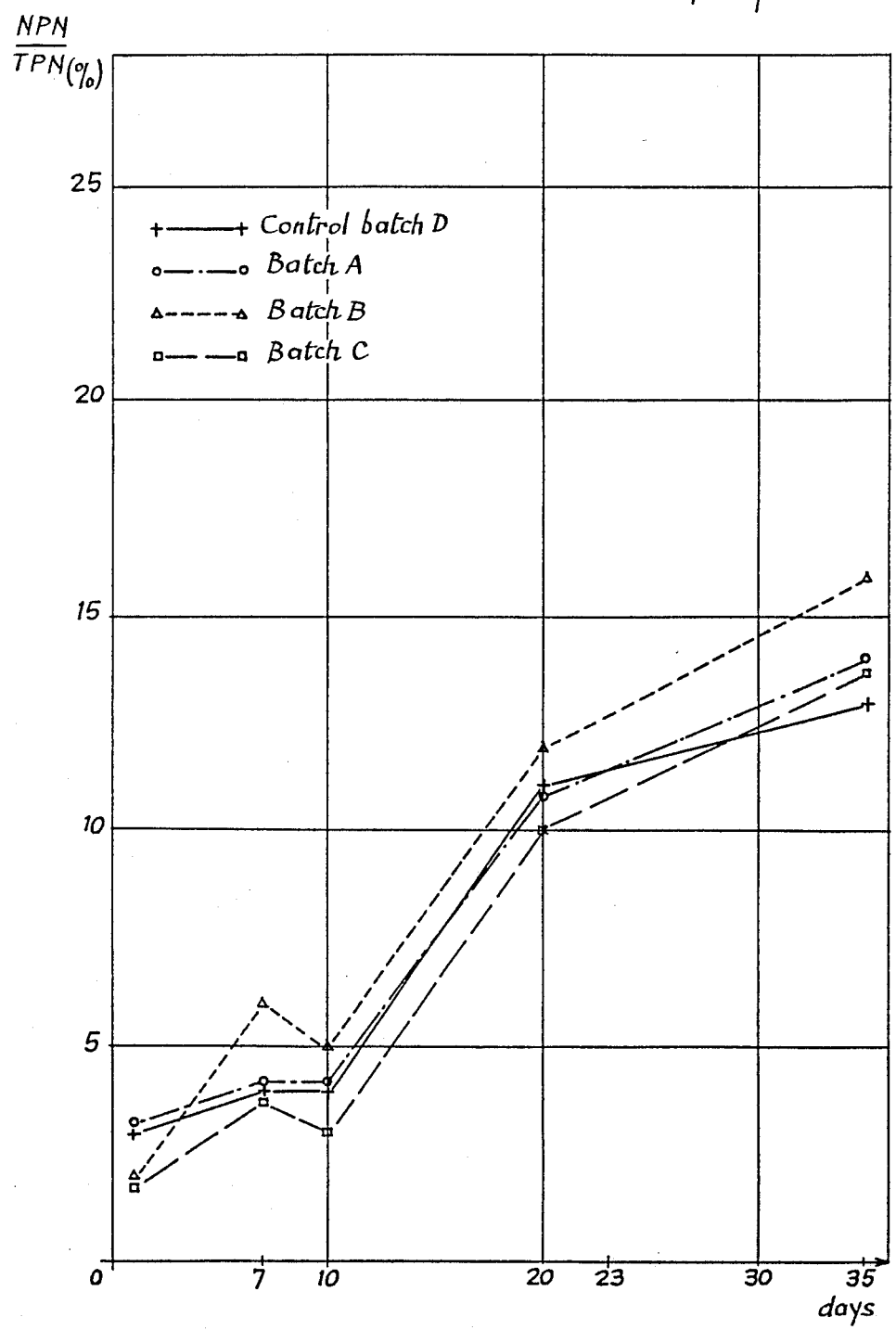

These results are presented in Table no. 1, FIG. 1 (change in the index SPN/TPN as a function of time) and FIG. 2 (change in the index NPN/TPN as a function of time).

They show a distinctly higher ratio SPN/TPN for cheeses which have been treated with protoplasts, as from day 15 (D15) in the case of batches A and C and as from day 27 (D27) in the case of batch B.

Differences, albeit less pronounced, are also found in respect of the ratio NPN/TPN.

(b) Organoleptic tests

A panel of five people assigned a mark from 0 to 4 in order to express:
a visual assessment of the degree of ripening,
a taste assessment of the degree of ripening, and
an overall assessment of the quality of the cheese.

The results of these tests are presented in Table no. 2, each mark representing the mean of the five marks assigned.

The results of these organoleptic tests show that the tasters clearly perceive the different degrees of ripening of the cheeses and the intensification of ripening achieved by introducing protoplasts into the milk. This is particularly obvious in the case of batch C, where the cheese literally flowed; this gave it a poor mark for the overall quality assessment but good marks for the assessment of its degree of ripening.

III—Conclusion

Taken as a whole, the results presented above clearly indicate that the process according to the invention for the manufacture of a camembert-type cheese permits an intensification of ripening which can be perceptible as from day 15 (D15) of the manufacturing process.

TABLE NO. 1

Proteolysis indices at the various stages of sampling

|   |   | Batch D (control) | Batch A | Batch B | Batch C |
|---|---|---|---|---|---|
| After salting | SPN/TPN | 0.06 | 0.07 | 0.04 | 0.05 |
|   | NPN/TPN | 0.03 | 0.03 | 0.02 | 0.02 |
| D7 | SPN/TPN | 0.07 | 0.07 | 0.08 | 0.06 |
|   | NPN/TPN | 0.04 | 0.04 | 0.06 | 0.04 |
| D10 | SPN/TPN | 0.09 | 0.08 | 0.07 | 0.09 |
|   | NPN/TPN | 0.04 | 0.04 | 0.05 | 0.03 |
| D23 | SPN/TPN | 0.15 | 0.17 | 0.13 | 0.18 |
|   | NPN/TPN | 0.11 | 0.11 | 0.12 | 0.10 |
| D35 | SPN/TPN | 0.18 | 0.28 | 0.22 | 0.27 |
|   | NPN/TPN | 0.13 | 0.14 | 0.16 | 0.14 |

TABLE No. 2

|   | Batch D (control) | | Batch A | | Batch B | | Batch C | |
|---|---|---|---|---|---|---|---|---|
|   | D23 | D35 | D23 | D35 | D23 | D35 | D23 | D35 |
| Overall quality assessment | 1.75 | 1.7 | 2 | 3 | 2.25 | 1.7 | 2.25 | 1 too ripe |
| Visual assessment of the degree of ripening | 1 | 1.5 | 2 | 2.25 | 2.25 | 2.5 | 1.75 | 3 |
| Taste assessment of the degree of ripening | 1.3 | 2.3 | 1 | 2.7 | 1.25 | 2 | 1.75 | 3 |

What is claimed is:

1. In a process for making cheese from milk which includes the steps of rennet addition, coagulation, draining and ripening, wherein the improvement comprises accelerating ripening by adding to milk, prior to adding rennet, an amount of protoplasts of cheese ripening bacteria which are sufficient to accelerate cheese ripening as compared to ripening with corresponding bacteria containing cell walls.

2. The process as claimed in claim 1 wherein the milk comprises an ultrafiltration residue.

3. The process as claimed in claim 1 wherein the protoplasts are lactic bacteria protoplasts.

4. The process as claimed in claim 2 wherein the protoplasts are lactic bacteria protoplasts.

5. The process as claimed in claim 1 wherein the amount of protoplasts added is $10^8$ to $10^{13}$ protoplasts of bacteria per liter of milk.

6. The process as claimed in claim 2 wherein the amount of protoplasts added is $10^8$ to $10^{13}$ protoplasts of bacteria per liter of milk.

7. The process of claim 1 wherein the cheese is a soft cheese of the camembert type, the protoplasts are lactic bacteria protoplasts and the amount of protoplast added is from $10^8$ to $10^{13}$ protoplasts per liter of milk.

* * * * *